(12) United States Patent
Wang et al.

(10) Patent No.: US 12,190,474 B2
(45) Date of Patent: Jan. 7, 2025

(54) SUPER-RESOLUTION RECONSTRUCTION METHOD AND RELATED APPARATUS

(71) Applicant: Tencent Technology (Shenzhen) Company Limited, Shenzhen (CN)

(72) Inventors: Ru Wang, Shenzhen (CN); Yaqing Li, Shenzhen (CN); Chengjie Tu, Shenzhen (CN); Shiyao Xiong, Shenzhen (CN); Linyan Jiang, Shenzhen (CN); Longtao Peng, Shenzhen (CN)

(73) Assignee: TENCENT TECHNOLOGY (SHENZHEN) COMPANY LIMITED, Palo Alto, CA (US)

( * ) Notice: Subject to any disclaimer, the term of this patent is extended or adjusted under 35 U.S.C. 154(b) by 378 days.

(21) Appl. No.: 17/739,004

(22) Filed: May 6, 2022

(65) Prior Publication Data
US 2022/0261960 A1 Aug. 18, 2022

Related U.S. Application Data

(63) Continuation of application No. PCT/CN2021/086584, filed on Apr. 12, 2021.

(30) Foreign Application Priority Data
May 21, 2020 (CN) .................. 202010435082.8

(51) Int. Cl.
G06T 3/4053 (2024.01)
G06T 3/4046 (2024.01)

(52) U.S. Cl.
CPC .......... G06T 3/4053 (2013.01); G06T 3/4046 (2013.01); G06T 2207/10016 (2013.01); G06T 2207/20081 (2013.01)

(58) Field of Classification Search
CPC ................ G06T 3/4053; G06T 3/4046; G06T 2207/10016; G06T 2207/20081
(Continued)

(56) References Cited

U.S. PATENT DOCUMENTS

2013/0301933 A1* 11/2013 Salvador ............... G06T 3/4053
382/263
2017/0193635 A1 7/2017 Zhao et al.
(Continued)

FOREIGN PATENT DOCUMENTS

CN 110136066 A 8/2019
CN 110490807 A 11/2019
(Continued)

OTHER PUBLICATIONS

Tencent Technology, ISR, PCT/CN2021/086584, Jun. 28, 2021, 2 pgs.
(Continued)

Primary Examiner — Michael R Neff
(74) Attorney, Agent, or Firm — Morgan, Lewis & Bockius LLP

(57) ABSTRACT

A computing device obtains a to-be-processed video frame sequence of a first resolution. For each to-be-processed video frame in the to-be-processed video frame sequence, the computing device: (i) performs resolution reconstruction according to a resolution reconstruction model so as to obtain an initial reconstructed video frame of a second resolution, (ii) determines a contour region in the initial reconstructed video frame; and (iii) performs contour enhancement on the contour region to obtain a target reconstructed video frame. The computing device generates a reconstructed video frame sequence of the second resolution
(Continued)

according to a plurality of target reconstructed video frames corresponding to the plurality of to-be-processed video frames.

20 Claims, 10 Drawing Sheets

(58) Field of Classification Search
USPC .......................................................... 382/157
See application file for complete search history.

(56) References Cited

U.S. PATENT DOCUMENTS

2020/0372609 A1* 11/2020 Li ......................... G06T 3/4053
2022/0108452 A1* 4/2022 Xiang ...................... G06T 7/11

FOREIGN PATENT DOCUMENTS

| | | |
|---|---|---|
| CN | 110533594 A | 12/2019 |
| CN | 111340711 A | 6/2020 |
| JP | 2008092462 A | 4/2008 |
| JP | 2010206273 A | 9/2010 |
| JP | 2017091231 A | 5/2017 |
| JP | 2019074892 A | 5/2019 |

OTHER PUBLICATIONS

Tencent Technology, WO, PCT/CN2021/086584, Jun. 28, 2021, 6 pgs.
Tencent Technology, IPRP, PCT/CN2021/086584, Nov. 17, 2022, 7 pgs.

* cited by examiner

SUPER-RESOLUTION RECONSTRUCTION METHOD AND RELATED APPARATUS

CROSS-REFERENCE TO RELATED APPLICATIONS

This application is a continuation application of PCT Patent Application No. PCT/CN2021/086584, entitled "SUPER-RESOLUTION RECONSTRUCTION METHOD AND RELATED DEVICE" filed on Apr. 12, 2021, which claims priority to Chinese Patent Application No. 202010435082.8, filed with the State Intellectual Property Office of the People's Republic of China on May 21, 2020, and entitled "SUPER-RESOLUTION RECONSTRUCTION METHOD AND APPARATUS, DEVICE, AND STORAGE MEDIUM", all of which are incorporated herein by reference in their entirety.

FIELD OF THE TECHNOLOGY

This application relates to the field of image processing, and in particular, to super-resolution reconstruction.

BACKGROUND OF THE DISCLOSURE

Image super-resolution refers to a technology of reconstructing a high-resolution image by processing one or more low-resolution images with complementary information, and is widely used in various fields in which quality of media data (for example, videos or images) needs to be improved, such as online video viewing, medical imaging, video surveillance, or remote sensing imaging.

SUMMARY

To resolve the foregoing technical problems, this application provides an artificial intelligence-based super-resolution reconstruction method and a related apparatus. An initial reconstructed video frame outputted by a model is post-processed, to obtain the picture quality that conforms to an actual online application scenario. The generalization effect is better, and the video viewing experience of the user can be improved.

The following technical solutions are disclosed in embodiments of this application:

According to an aspect, an embodiment of this application provides an artificial intelligence-based super-resolution reconstruction method. The method includes:
  obtaining a to-be-processed video frame sequence of a first resolution, the to-be-processed video frame sequence including a plurality of to-be-processed video frames;
  for each to-be-processed video frame in the to-be-processed video frame sequence, performing resolution reconstruction according to a resolution reconstruction model so as to obtain an initial reconstructed video frame of a second resolution, the second resolution being greater (e.g., better) than the first resolution;
  for each to-be-processed video frame in the to-be-processed video frame sequence, determining a contour region in the initial reconstructed video frame;
  for each to-be-processed video frame in the to-be-processed video frame sequence, performing contour enhancement on the contour region to obtain a target reconstructed video frame; and
  generating a reconstructed video frame sequence of the second resolution according to a plurality of target reconstructed video frames corresponding to the plurality of to-be-processed video frames.

According to another aspect, an embodiment of this application provides an artificial intelligence-based super-resolution reconstruction apparatus, including an obtaining unit, a reconstruction unit, a determining unit, a processing unit, and a generation unit:
  the obtaining unit being configured to obtain a to-be-processed video frame sequence of a first resolution;
  the reconstruction unit being configured to perform, for each to-be-processed video frame in the to-be-processed video frame sequence, resolution reconstruction on the to-be-processed video frame according to a resolution reconstruction model, to obtain an initial reconstructed video frame of a second resolution, the second resolution being greater than the first resolution;
  the determining unit being configured to determine a contour region in the initial reconstructed video frame;
  the processing unit being configured to perform contour enhancement on the contour region to obtain a target reconstructed video frame; and
  the generation unit being configured to generate a reconstructed video frame sequence of the second resolution according to the target reconstructed video frames.

According to another aspect, an embodiment of this application provides a device, including a processor and memory,
  the memory being configured to store program code and transmit the program code to the processor; and
  the processor being configured to perform the super-resolution reconstruction method described in the foregoing aspect according to instructions in the program code.

According to another aspect, an embodiment of this application provides a non-transitory computer-readable storage medium, configured to the super-resolution reconstruction method described in the foregoing aspect.

According to another aspect, an embodiment of this application provides a computer program product including instructions, the computer program product, when run on a computer, causing the computer to perform the super-resolution reconstruction method described in the foregoing aspect.

It can be seen from the foregoing technical solutions that, when super-resolution reconstruction needs to be performed on a video file, a to-be-processed video frame sequence of a first resolution in the video file is obtained. For each to-be-processed video frame in the to-be-processed video frame sequence, resolution reconstruction is performed on the to-be-processed video frame according to a resolution reconstruction model, to obtain an initial reconstructed video frame of a second resolution, the second resolution being greater than the first resolution. To improve the picture quality of the initial reconstructed video frame, post-processing may be performed on the obtained initial reconstructed video frame, that is, a contour region in the initial reconstructed video frame is determined; and contour enhancement is performed on the contour region to obtain a target reconstructed video frame. Fine contour enhancement is performed on the initial reconstructed video frame, so that high-frequency details are clearer, thereby obtaining the picture quality conforming to an actual online application scenario. The generalization effect is better. Through the reconstructed video frame sequence, a cleaner, clearer, more natural and comfortable video picture can be provided for users, which is conducive to improving the video viewing experience of users.

BRIEF DESCRIPTION OF THE DRAWINGS

To describe the technical solutions in the embodiments of this application or in the related art more clearly, the following briefly describes the accompanying drawings required for describing the embodiments or the related art. Apparently, the accompanying drawings in the following description show only some embodiments of this application, and a person of ordinary skill in the art may derive other drawings from the accompanying drawings without creative efforts.

DESCRIPTION OF EMBODIMENTS

Figure 1:
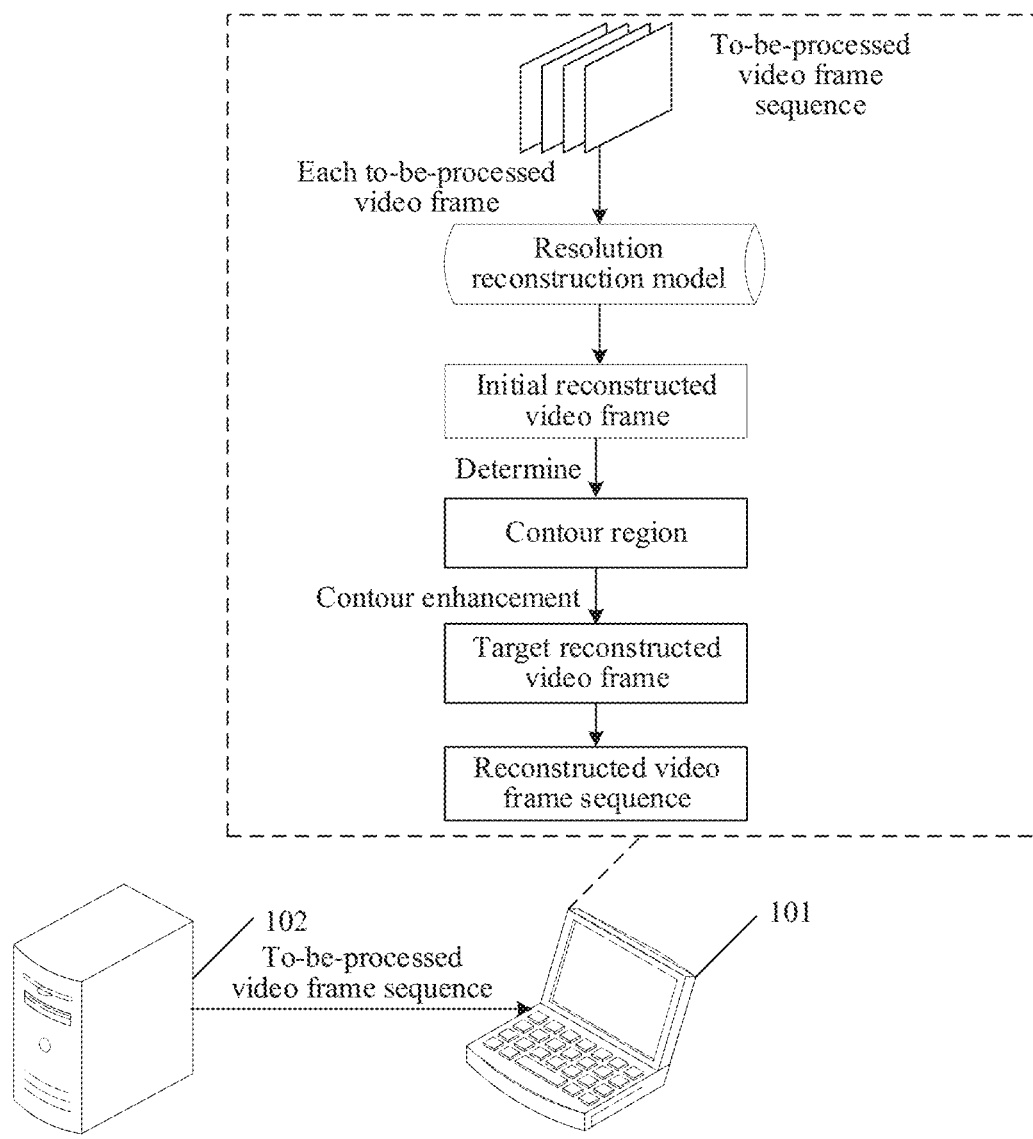
FIG. 1 is a schematic diagram of an application scenario of an artificial intelligence-based super-resolution reconstruction method according to an embodiment of this application.

The following describes embodiments of this application with reference to the accompanying drawings.

In the related art, during super-resolution reconstruction, a simple end-to-end mapping manner is often used, that is, a low-resolution image is directly processed by a model to obtain a super-resolution reconstruction result. However, for real scenarios online, this manner has a poor generalization effect, and cannot achieve a satisfactory super-resolution effect in some scenarios.

Therefore, the embodiments of this application provide an artificial intelligence-based super-resolution reconstruction method. After an initial reconstructed video frame is obtained based on a resolution reconstruction model, the initial reconstructed video frame may be post-processed, so that high-frequency details in the initial reconstructed video frame are clearer, thereby obtaining a result with best picture quality conforming to an actual online application scenario, that is, a target reconstructed video frame. In this way, a reconstructed video frame sequence of a second resolution is generated according to the target reconstructed video frame, which can provide users with a cleaner, clearer, and more natural and comfortable video viewing experience.

The method provided in the embodiments of this application relates to the field of cloud technology, for example, big data. Big data refers to a collection of data that cannot be captured, managed, and processed by conventional software tools within a certain time range. Big data is a massive, rapidly growing and diversified information asset. It requires new processing modes with better decision-making, insight, and process optimization capabilities. With the advent of a cloud era, the big data also attracts more and more attention, and the big data requires special techniques to efficiently process a large amount of data that tolerates elapsed time. Technologies applicable to the big data, include a massively parallel processing database, data mining, a distributed file system, a distributed database, a cloud computing platform, an Internet, and a scalable storage system. For example, online to-be-processed video frame sequences are obtained and online real high-definition videos are mined as original video samples for training resolution reconstruction models.

For example, the artificial intelligence cloud service is involved, which is generally referred to as AI as a Service (AIaaS), Chinese for "AI is a service". This is a current mainstream service manner of artificial intelligence platforms. Specifically, the AIaaS platform splits several types of common AI services and provides independent or packaged services in the cloud. This service mode is similar to opening an AI-themed mall: All developers can access one or more artificial intelligence services provided by the platform through API interfaces, and some senior developers can further use the AI framework and AI infrastructure provided by the platform to deploy and operate own dedicated cloud AI services.

Artificial intelligence (AI) is a theory, method, technology, and application system in which a digital computer or a machine controlled by a digital computer is used for simulating, extending, and expanding human intelligence, sensing an environment, acquiring knowledge, and using the knowledge to obtain an optimal result.

The AI technology is a comprehensive discipline, covering a wide range of fields, and including both a hardware-level technology and a software-level technology. AI software technologies mainly include a computer vision technology, a speech processing technology, a natural language processing technology, machine learning/deep learning (DL), and the like.

In the embodiments of this application, the involved AI technologies include orientations such as computer vision (image) and machine learning. Computer vision (CV) is a science that studies how to use a machine to "see", and furthermore, is machine vision that a camera and a computer are used for replacing human eyes to perform recognition, tracking, measurement, and the like on a target, and further perform graphic processing, so that the computer processes the target into an image more suitable for human eyes to observe, or an image transmitted to an instrument for detection.

For example, in the embodiments of this application, processing such as down-sampling, video compression, and contour enhancement may be performed on original video samples through a video processing technology in the computer vision technology. Images are segmented through an image segmentation technology in image semantic understanding (ISU). In a process of resolution reconstruction training, feature extraction may be performed through an image feature extraction technology in image semantic understanding.

Machine learning is a multi-field interdisciplinary subject involving the probability theory, statistics, the approximation theory, convex analysis, the algorithm complexity theory, and the like. The machine learning specializes in studying how a computer simulates or implements a human learning behavior to obtain new knowledge or skills, and reorganize an existing knowledge structure, to keep improving its performance. Machine learning is the core of AI, is a basic way to make the computer intelligent, and is applied to various fields of AI. The machine learning generally includes technologies such as deep learning (DL), and the DL includes artificial neural networks such as a convolutional neural network (CNN), a recurrent neural network (RNN), and a deep neural network (DNN).

In this embodiment, a resolution reconstruction model may be trained using machine learning, to perform resolution reconstruction on a to-be-processed video frame sequence using the resolution reconstruction model.

The method provided in the embodiments of this application may be applied to various application scenarios where an improved video quality (e.g., better video resolution, higher video definition, sharper, crisper images, etc.) are desirable so as to provide users with a better viewing experience. For example, when users watch videos through various long video applications (APPs), the method may be used as ultra-high-definition/Blu-ray/4K files according to needs, or as a technical means to refurbish old videos; or may be used in various short video APPs to improve the clarity of unclear videos; or may be used in scenarios such as 4K content resource production.

For ease of understanding of the technical solutions of this application, the artificial intelligence-based super-resolution reconstruction method provided in the embodiments of this application is described below with reference to an actual application scenario.

FIG. 1 is a schematic diagram of an application scenario of a super-resolution reconstruction method according to an embodiment of this application. The application scenario includes a terminal device 101 and a server 102. A video APP may be installed on the terminal device 101. When the terminal device 101 obtains a video file, a resolution reconstruction model trained by using this method may be used to perform super-resolution reconstruction on the video file to obtain a clearer video.

There are a large quantity of video files on the Internet, and these video files may be various types of video files, such as game videos, animation videos, video files of real people, and other video files. When a user watches a video through a video APP on the terminal device 101, to improve the speed at which the server 102 transmits video files to the terminal device 101, relieve the pressure of network transmission, and the like, the resolution of the video file provided by the server 102 to the terminal device 101 may be relatively low, and the video may not be clear. After receiving the video file, the terminal device 102 may perform super-resolution reconstruction on the video file to improve the resolution and clarity of the video for the user to watch. In another example, if 4K content resources are expected to be produced, the server 102 or the terminal device 101 may alternatively perform super-resolution reconstruction on low-resolution video files, and the like.

The terminal device 101 may be a smartphone, a tablet computer, a notebook computer, a desktop computer, a smart speaker, a smartwatch, or the like, but is not limited thereto. The server 102 may be an independent physical server, or may be a server cluster that includes a plurality of physical servers or a distributed system, or may be a cloud server providing a cloud computing service. The terminal device 101 and the server 102 may be directly or indirectly connected in a wired or wireless communication manner. This is not limited in this application.

In this embodiment, the super-resolution reconstruction method provided in this embodiment of this application may be applied to the terminal device 101, and the terminal device 101 may be a device with a graphics processing unit (GPU). Certainly, in some scenarios, the foregoing method may be further applied to the server 102, and this is not limited in this embodiment of this application.

The terminal device 101 may obtain a to-be-processed video frame sequence of a first resolution. The to-be-processed video frame sequence may be a video frame sequence of a video file played on the terminal device 101 that needs super-resolution reconstruction.

For each to-be-processed video frame in the to-be-processed video frame sequence, the terminal device 101 performs resolution reconstruction on the to-be-processed video frame according to a resolution reconstruction model, to obtain an initial reconstructed video frame of a second resolution, the second resolution being greater than the first resolution.

In some embodiments, although super-resolution reconstruction can be achieved, the obtained initial reconstructed video frame may not be a result with the best picture quality in this application scenario. Therefore, the obtained initial reconstructed video frame may be post-processed, whereby the terminal device 101 determines a contour region in the initial reconstructed video frame in a residual separation method (e.g., manner) and performs contour enhancement on the contour region to obtain a target reconstructed video frame. Fine contour enhancement is performed on the initial reconstructed video frame, so that high-frequency details are clearer, thereby obtaining a result with best picture quality conforming to an actual online application scenario, that is, a target reconstructed video frame. In this way, a reconstructed video frame sequence of a second resolution is generated according to the target reconstructed video frame, which can provide users with a cleaner, clearer, and more natural and comfortable video viewing experience.

Next, the artificial intelligence-based super-resolution reconstruction method provided in the embodiments of this application is described with reference to the accompanying drawings by using a terminal device as an example.

Figure 2:
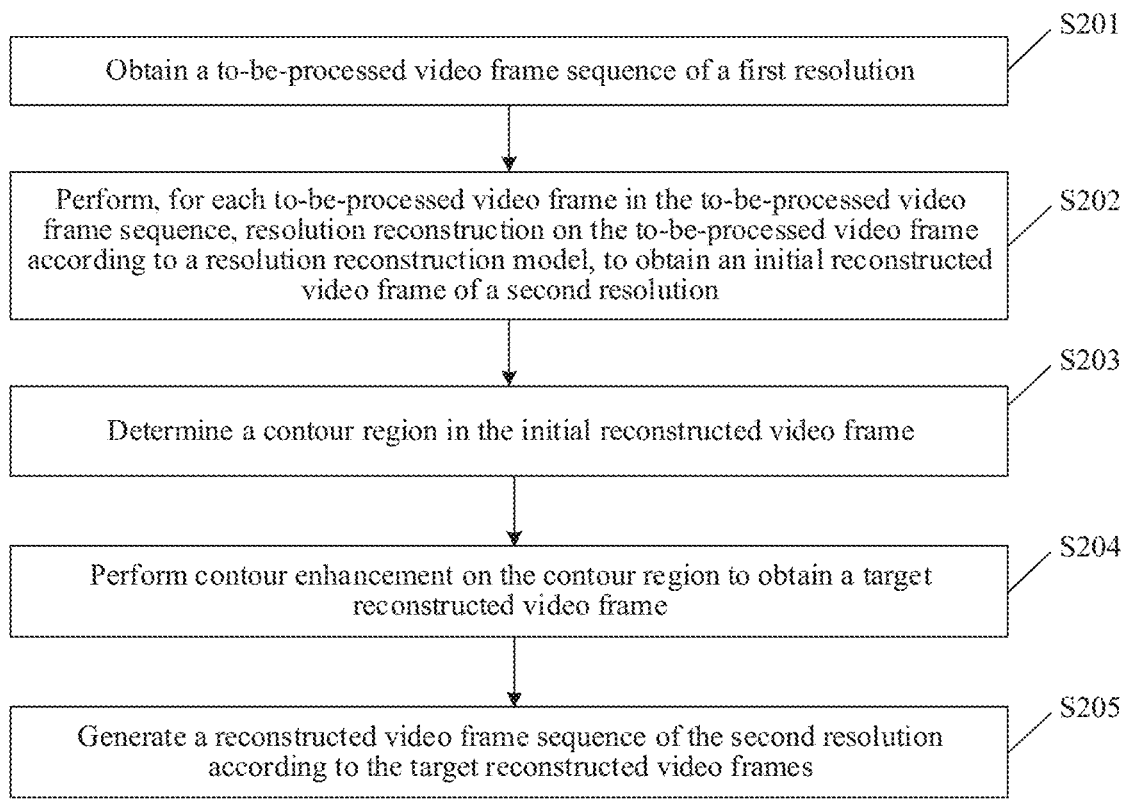
FIG. 2 is a flowchart of an artificial intelligence-based super-resolution reconstruction method according to an embodiment of this application.

FIG. 2 is a flowchart of an artificial intelligence-based super-resolution reconstruction method in accordance with some embodiments. The method includes:

S201: Obtain a to-be-processed video frame sequence of a first resolution.

The to-be-processed video frame sequence is a video frame sequence of a video file played on the terminal device that needs super-resolution reconstruction. The to-be-processed video frame sequence includes a plurality of frames (e.g., video frames or image frames). For example, the to-be-processed video frame sequence is a video frame sequence obtained by the terminal device from the server, but the resolution (for example, the first resolution) of the video frame sequence is less than a resolution corresponding to some playback requirements.

In this embodiment, the timing of performing super-resolution reconstruction on the video file may be different. One is to directly perform super-resolution reconstruction on the video file as long as the video file is received. The other is to perform super-resolution reconstruction in response to a resolution switching instruction. For example, when the user finds that the current resolution is low and the video is not clear enough, the resolution switching instruction is triggered based on the requirement of increasing the playback resolution. In the second case, the method of obtaining the to-be-processed video frame sequence of the first resolution may be: obtaining a video playback instruction, the video playback instruction indicating that a specific video file needs to be played; and obtaining and playing the video file according to the video playback instruction. During the playback of the video file, if the user finds that the resolution of the video file is low and the video is not very clear, the user may choose to switch the resolution to trigger the resolution switching instruction. When the resolution switching instruction for the video file is detected, and if a switched resolution indicated by (e.g., specified by) the resolution switching instruction is associated with the second resolution, S202 is performed.

S202: Perform, for each to-be-processed video frame in the to-be-processed video frame sequence, resolution reconstruction on the to-be-processed video frame according to a resolution reconstruction model, to obtain an initial reconstructed video frame of a second resolution.

After obtaining the to-be-processed video frame sequence, the terminal device may use each frame of to-be-processed video frame in the to-be-processed video frame sequence as a low-resolution (LR) image and input the low-resolution image to the resolution reconstruction model. Resolution reconstruction is performed on each frame of to-be-processed video frame through the resolution reconstruction model, to obtain the initial reconstructed video frame of the second resolution, that is, obtain a super-resolution (SR) image. The second resolution is greater than the first resolution, that is, through the resolution reconstruction model, the resolution of each frame of to-be-processed video frame in the video file may be increased.

S203: Determine a contour region in the initial reconstructed video frame.

Performing super-resolution reconstruction through the resolution reconstruction model can improve the resolution of the to-be-processed video frame, but the obtained initial reconstructed video frame may not be a result with the best picture quality in this application scenario. Therefore, the obtained initial reconstructed video frame may be post-processed.

In this embodiment, the initial reconstructed video frame generally includes a high-frequency detail region that reflects texture details, that is, the contour region. To face complex online application scenarios, after the initial reconstructed video frame is obtained through the resolution reconstruction model, the contour enhancement degree may be finely adjusted, thereby improving the output picture quality in various application scenarios. The contour region is a contour of an object displayed in the video frame, and the object may be a person, various objects, and the like.

In addition, the initial reconstructed video frame may further include some flat regions that are concentrated and flat, and lack texture details. There may be some noise in the flat region. To optimize the output picture quality, the flat region in the initial reconstructed video frame may be alternatively determined in a residual separation manner, to perform contour enhancement on the contour region and perform denoising on the flat region, to obtain the target reconstructed video frame.

This application does not limit the specific determination method for determining the contour region in the video frame, for example, various methods that can realize contour recognition, such as the residual separation manner, may be used.

Figure 3:
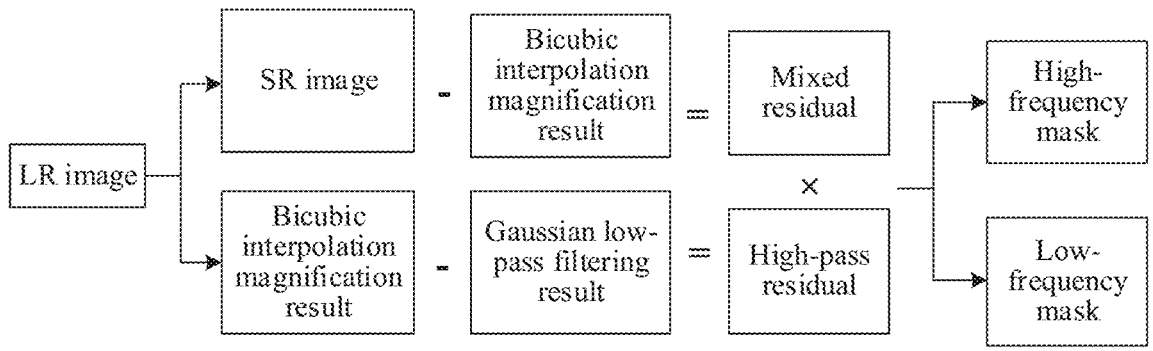
FIG. 3 is a flowchart of determining a high-frequency mask and a low-frequency mask in a residual separation method according to an embodiment of this application.

In some possible embodiments, the manner of determining the contour region and the flat region may be: obtaining, for each to-be-processed video frame in the to-be-processed video frame sequence, a bicubic interpolation magnification result through bicubic interpolation; and performing residual separation according to the initial reconstructed video frame corresponding to the to-be-processed video frame and the bicubic interpolation magnification result to obtain a high-frequency mask and a low-frequency mask. The flowchart of determining the high-frequency mask and the low-frequency mask in the residual separation method (e.g., manner) is shown in FIG. 3. The SR image is generated by the resolution reconstruction model according to the LR image. According to the LR image, the bicubic interpolation method is used to generate the bicubic interpolation magnification result, and generate a residual image (mixed residual) of the SR image and the bicubic interpolation magnification result. The residual image (mixed residual) may be obtained by subtracting the SR image and the bicubic interpolation magnification result (e.g., by subtracting the bicubic interpolation magnification result from the SR image). FIG. 3 also shows the generation of another residual image (high-pass residual) according to the bicubic interpolation magnification result and a Gaussian low-pass filtering result (Gaussian blur standard deviation σ=1.5, radius r=5). The residual image (high-pass residual) may be obtained by subtracting the bicubic interpolation magnification result and the Gaussian low-pass filtering result (e.g., by subtracting the Gaussian low-pass filtering result from the bicubic interpolation magnification result). The two residuals (the mixed residual and the high-pass residual) are multiplied. A positive multiplication result (i.e., greater than 0) is assigned a value of 1, and a negative multiplication result (i.e., less than 0) is assigned a value of 0, to obtain a high-frequency mask (mask$_h$). Further, a negative multiplication result (less than 0) is assigned a value of 1, and a positive multiplication result (greater than 0) is assigned a value of 0, to obtain a low-frequency mask (mask$_l$). mask$_h$ and mask$_l$ are used as the basis for determining positions of the contour region and the flat region in the SR image.

The contour region is then determined according to the initial reconstructed video frame, the bicubic interpolation magnification result, and the high-frequency mask, as shown in formula (1). The flat region may be further determined according to the initial reconstructed video frame, the bicubic interpolation magnification result, and the low-frequency mask, as shown in formula (2).

$$f_{SR_h}(x) = (f_{SR}(x) - f_{Bicubic}(x)), \text{mask}_h; \text{and} \quad (1)$$

$$f_{SR_l}(x) = (f_{SR}(x) - f_{Bicubic}(x)), \text{mask}_l, \quad (2)$$

where $f_{SR_h}(x)$ is the contour region, $f_{SR}(x)$ is the SR image (the initial reconstructed video frame), $f_{Bicubic}(x)$ is the bicubic interpolation magnification result, $f_{SR_l}(x)$ is the flat region, mask$_h$ is the high-frequency mask, mask$_l$ is the low-frequency mask, and "·" represents a point multiplication operation.

S204: Perform contour enhancement on the contour region to obtain a target reconstructed video frame.

In some embodiments, the manner of performing contour enhancement on the contour region to obtain a target reconstructed video frame may be: performing contour enhancement on the contour region and performing denoising on the flat region, to obtain the target reconstructed video frame. The contour enhancement for the contour region may be to adjust the contour region by using a contour enhancement coefficient, and the denoising for the flat region may be to process the flat region by using a denoising coefficient.

The contour enhancement coefficient may be selected according to the application scenario. Different application scenarios have different requirements for the contour enhancement degree, and the contour enhancement coefficients used are also different. In a scenario of an animation video or game video, lines in the video are simple. Therefore, the contour enhancement degree may be larger, and the contour enhancement coefficient may take a value greater than 1, for example, take a value greater than 1 and less than or equal to 2. However, in a scenario of a film and television video shot by a real person, if the contour enhancement degree of the person in the video is relatively large, the user watching the video feels that the person is abrupt and the picture is uncoordinated, so that the viewing experience is relatively poor. Therefore, in this scenario, the lower contour enhancement degree is to be relatively small, and the contour enhancement coefficient may even take a value less than 1, for example, a value greater than or equal to 0 and less than or equal to 1.

In some embodiments, the flat region in the initial reconstructed video frame may be further determined. To further improve the resolution and clarity of the video and improve the user experience of watching the video, the low-frequency flat region in the initial reconstructed video frame may be further denoised. Similarly, the denoising degree may also be determined according to the application scenario. While the contour region is adjusted through the contour enhancement coefficient, the flat region may also be adjusted through the noise coefficient. The denoising coefficient may also take an appropriate value according to different application scenarios.

After the contour region and the flat region are determined, the contour enhancement coefficient may be α, the denoising coefficient may be β, where α∈[0, 2], and β∈[0, 2]. The specific values of α and β may be selected according to the specific application scenario, to perform contour enhancement and denoising intensity adjustment on the SR image. The obtained target reconstructed video frame Y may be expressed as:

$$Y = \alpha \times f_{SR_h}(x) + \beta \times f_{SR_l}(x) + f_{Bicubic}(x) \quad (3),$$

where x represents the LR image, $f_{SR_h}(x)$ is the contour region, $f_{SR_l}(x)$ is the flat region, and $f_{Bicubic}(x)$ represents the bicubic interpolation magnification result.

In this embodiment of this application, after the initial reconstructed video frame is obtained through the resolution reconstruction model, the contour enhancement degree is refined and adjusted, to face complex online application scenarios, improve the output picture quality in any application scenario, and enhance the universality.

Figure 4:
FIG. 4 is a diagram of an effect comparison of different super-resolution reconstruction methods according to an embodiment of this application.
Figure 4:

FIG. 4 shows an effect comparison of different super-resolution reconstruction methods. The left picture is a bicubic interpolation magnification result, and the right picture is a target reconstructed video frame obtained by using the super-resolution reconstruction method provided in this embodiment of this application. It can be seen that the right picture is cleaner and clearer than the left picture, and is more natural and comfortable to view.

S205: Generate a reconstructed video frame sequence of the second resolution according to the target reconstructed video frames.

The reconstructed video frame sequence is generated according to an order of the target reconstructed video frames corresponding to the to-be-processed video frames in the to-be-processed video frame sequence for playback according to the reconstructed video frame sequence. That is, each time a video frame is played, a target reconstructed video frame is determined from the reconstructed video frame sequence for playback.

Therefore, after the reconstructed video frame sequence is generated, a next video frame of a currently played video frame may be determined; a target reconstructed video frame corresponding to the next video frame may be determined in the reconstructed video frame sequence; and the target reconstructed video frame corresponding to the next video frame is switched when the next video frame is played, and the target reconstructed video frame in the reconstructed video frame sequence is played.

For example, when the currently played video frame is a $10^{th}$ video frame, the next video frame is an $11^{th}$ video frame. When the $11^{th}$ video frame is played, a target reconstructed video frame corresponding to the $11^{th}$ video frame is switched to for playback.

It can be seen from the foregoing technical solutions that, when super-resolution reconstruction needs to be performed on a video file, a to-be-processed video frame sequence of a first resolution in the video file is obtained. For each to-be-processed video frame in the to-be-processed video frame sequence, resolution reconstruction is performed on the to-be-processed video frame according to a resolution reconstruction model, to obtain an initial reconstructed video frame of a second resolution, the second resolution being greater than the first resolution. To improve the picture quality of the initial reconstructed video frame, post-processing may be performed on the obtained initial reconstructed video frame, that is, a contour region in the initial reconstructed video frame is determined: and contour enhancement is performed on the contour region to obtain a target reconstructed video frame. Fine contour enhancement is performed on the initial reconstructed video frame, so that high-frequency details are clearer, thereby obtaining the picture quality conforming to an actual online application scenario. The generalization effect is better. Through the reconstructed video frame sequence, a cleaner, clearer, and more natural and comfortable video picture can be provided for users, which is conducive to improving the video viewing experience of users.

In this embodiment, there may be various model types and topological structures of the resolution reconstruction model, which may be various neural network models that can realize resolution reconstruction. In some possible embodiments, a structure of a residual network (ResNet) improved by an enhanced deep super-resolution network (EDSR) may be used as a backbone of the resolution reconstruction model. Combined with a deep-recursive convolutional network (DRCN), features at all levels of the network participate in the final resolution reconstruction.

Figure 5:
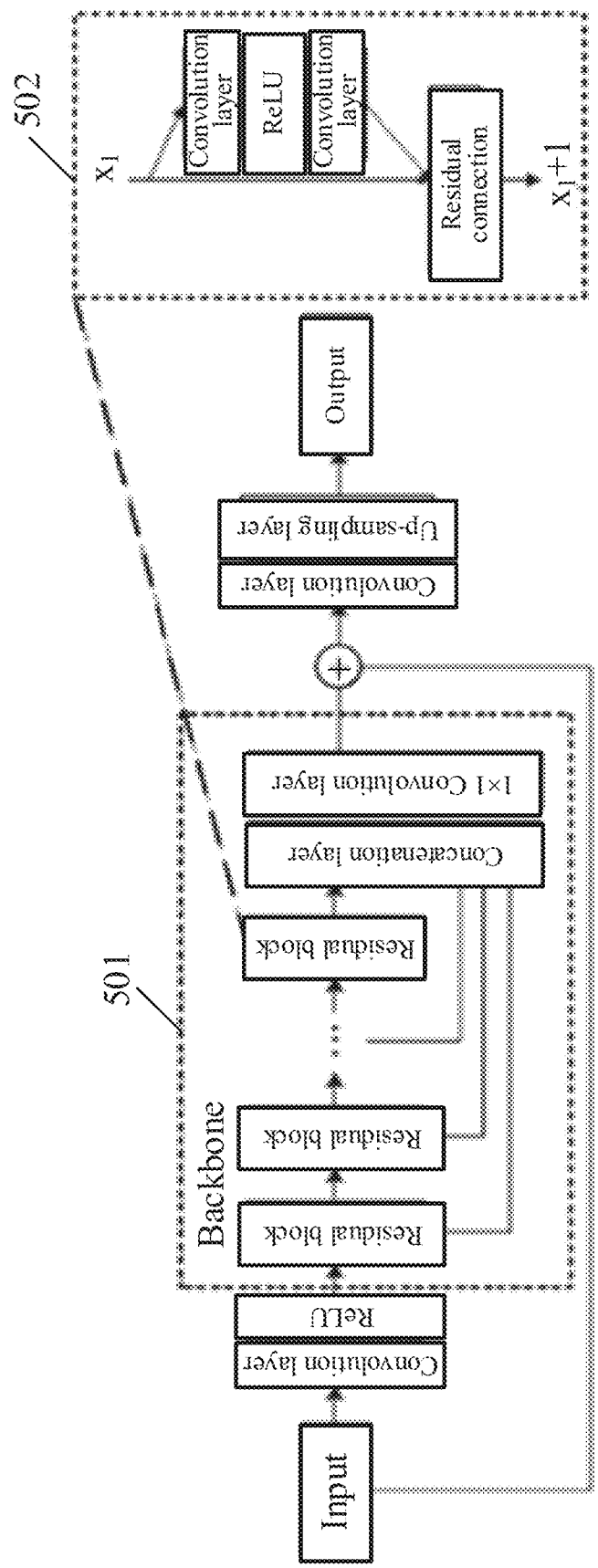
FIG. 5 is a schematic structural diagram of a resolution reconstruction model according to an embodiment of this application.

Taking the establishment of a resolution reconstruction model for double super-resolution as an example, the resolution reconstruction model may use a network structure shown in FIG. 5. The specific parameters of the resolution reconstruction model are as follows: An input of the resolution reconstruction model is a red-green-blue (RGB) three-channel map. A quantity of input channels of a first layer convolutional network is 3, a quantity of output feature channels is 32, a size of a convolution kernel is 3×3, and a convolution stride is 1. A rectified linear unit (ReLU) layer is then collected. The backbone includes five residual blocks (ResBlock). As shown in 501 in FIG. 5, each ResBlock includes two convolutional network layers and one ReLU layer. The input and output form a residual connection (as shown by 502 in FIG. 5). $x_1$ represents the input of ResBlock, and $x_1+1$ represents the output after the residual connection in the ResBlock. The parameters of all the convolutional network layers of the ResBlock are set the same. The quantities of input and output feature channels are both 32, the size of the convolution kernel is 3×3, and the convolution stride is 1.

A concatenation layer (concat) is then connected to concatenate outputs of the five ResBlocks to obtain features of 32×5=160 dimensions. The features are fused through a convolution layer with a convolution kernel size of 32, and the quantity of output feature channels is 32.

Convolution is performed on an obtained feature map. The quantity of input channels of the convolutional network is 32, a quantity of output feature channels is 12, a size of a convolution kernel is 3×3, and a convolution stride is 1. An up-sampling (subpixel) layer is then connected to up-sample the feature map to obtain a result super-resolution magnified twice for output, that is, the initial reconstructed video frame is outputted.

The quantity of subpixel layers is related to the magnification of the super-resolution. If the super-resolution magnification is twice, a subpixel layer is connected as shown in FIG. 5. If the super-resolution magnification is four times, two subpixel layers are connected. If the super-resolution magnification is eight times, three subpixel layers are connected, and so on.

Based on the network structure of the resolution reconstruction model shown in FIG. 5, the method for obtaining the initial reconstructed video frame of the second resolution in S202 may be to perform residual extraction on the to-be-processed video frame at least twice by using the resolution reconstruction model to obtain residual extraction results; and perform resolution reconstruction on the to-be-processed video frame based on the residual extraction results, to obtain the initial reconstructed video frame of the second resolution.

In some embodiments, the manner of obtaining the residual extraction results may be to perform convolution processing on the to-be-processed video frame by using a convolution layer in the resolution reconstruction model to obtain convolution processing results corresponding to the to-be-processed video frame; and sequentially perform residual extraction by using residual blocks (for example, the residual blocks in FIG. 5) in a backbone based on the convolution processing results to obtain the residual extraction results of the residual blocks, the residual blocks being cascaded.

In the network structure shown in FIG. 5, after five residual blocks are cascaded, the concatenation layer and the convolution layer are connected. The residual extraction results may be concatenated through the concatenation layer to obtain residual concatenation features, and feature fusion is performed on the residual concatenation features to obtain a fused feature map. Up-sampling is then performed on the fused feature map to obtain the initial reconstructed video frame of the second resolution, the initial reconstructed video frame being corresponding to the to-be-processed video frame.

The embodiments of this application do not specifically limit the model type and topology of the resolution reconstruction model, which may be replaced with other effective new model structures. For example, the backbone may be replaced from the ResNet residual structure to a dense convolutional network (DenseNet) connected structure. The network structure of the resolution reconstruction model may be changed, expanded, or simplified according to the requirements for the expression capability of the resolution reconstruction model and the computing resource conditions.

In this embodiment of this application, a relatively lightweight network is used to implement model calculation, and a t4 GPU may process a video with a resolution of 0.1080× 1920, which can achieve a real-time processing speed of 60 fps for 4 cards (the real-time processing speed of 60 fps for 4 cards, that is, 60 fps real-time processing speed can be achieved by parallel processing of four graphics cards including t4 GPU), which can realize real-time super-resolution reconstruction.

In this embodiment of this application, the resolution reconstruction model is used to perform resolution reconstruction on the to-be-processed video frame to obtain the initial reconstructed video frame. The reconstruction effect of the resolution reconstruction model has an important impact on the final obtained image effect of the target reconstructed video frame. Next, the training method of the resolution reconstruction model is described in detail.

In the related art, in the process of training the resolution reconstruction model, a degradation method used is too simple, which is far from a degradation scenario from a real HR image to an LR image. If the resolution reconstruction model is trained on such a training data set, the generalization effect of the obtained resolution reconstruction model is poor.

Figure 6:
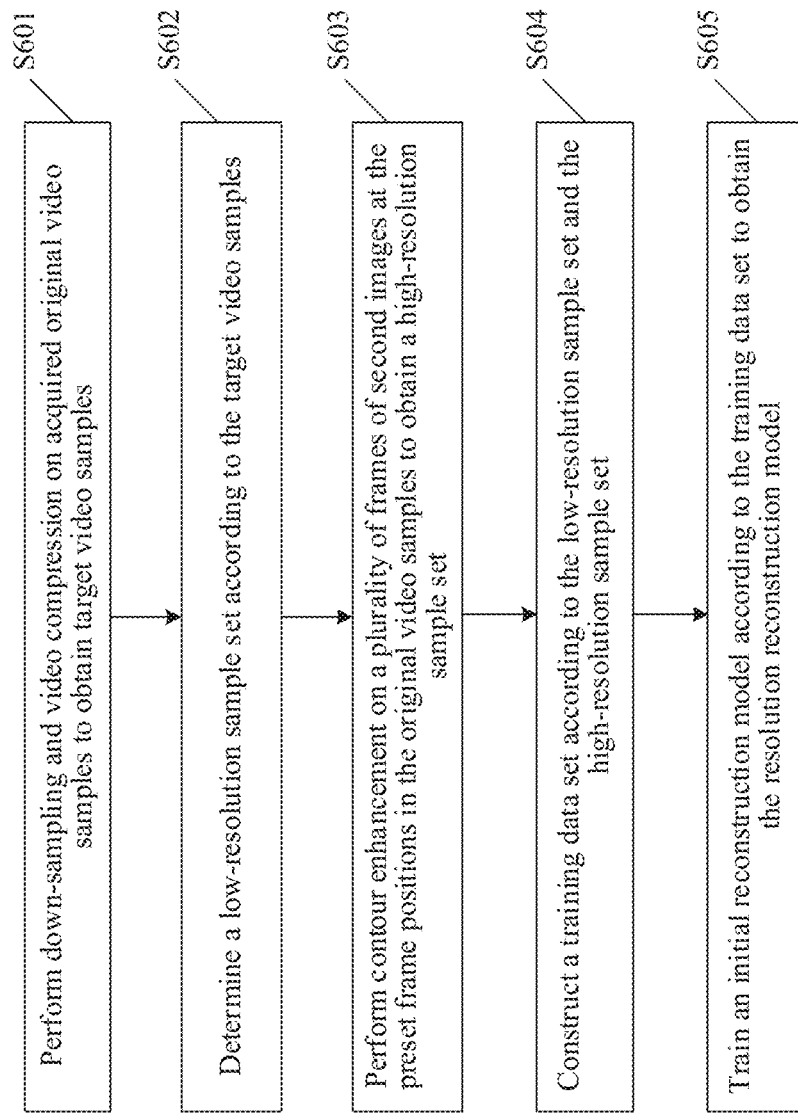
FIG. 6 is a flowchart of a method for training an artificial intelligence-based resolution reconstruction model according to an embodiment of this application.

When simulating degradation, considering that in addition to down-sampling in practical application scenarios, there are image blurring and video coding that bring compression noise, and the like. In addition, because the sequence of down-sampling and image blurring is difficult to confirm, in order to facilitate the construction of training data sets, an image in the process of generating the low-resolution sample set is blurred, and this degradation is simulated by performing contour enhancement on the high-definition video, thereby constructing a training data set including a low-resolution sample set and a high-resolution sample set, to train the resolution reconstruction model. Referring to FIG. 6, the steps of training the resolution reconstruction model in the method include.

S601: Perform down-sampling and video compression on acquired original video samples to obtain target video samples.

There are a large quantity of high-resolution videos on the Internet, and these high-resolution videos may be used as the basis for constructing training data sets. The terminal device may acquire a large quantity of high-resolution videos on the network (for example, videos with resolutions that are higher than a preset threshold) as the original video samples, and the high-resolution videos may be various types of videos, such as game videos, animation videos, video files of real people, and other videos. For example, the original video samples may be high-definition videos commonly seen in video viewing scenarios, and the like.

Considering the actual online application scenario, a manner closer to the real online situation is used to simulate a degradation model of a high-resolution video image to a low-resolution video image. In this embodiment, the used degradation model may be expressed as:

$$Y=\phi_n(\phi_{Blur}(\phi_s(X))), \text{ or } Y=\phi_n(\phi_{Blur}(X))) \qquad (4),$$

where X represents the high-resolution image, Y represents the low-resolution image, $\phi_s$ ( ) represents down-sampling, $\phi_{Blur}$ ( ) represents image blur, and $\phi_n$ ( ) represents noise.

There are many manners of down-sampling. In some embodiments, down-sampling may be performed on the original video samples through bicubic interpolation. Considering that the video encoding process always leads to compression distortion, which brings compression noises such as artifacts, block effects, and contour edge burrs, in this embodiment, video compression is performed on the original video samples to simulate a noise model in degradation.

When video compression is performed on the original video samples, a constant rate factor (CRF) is usually used to achieve video compression. Using different CRFs to achieve video compression results in different video compression results. Based on this, in this embodiment, a plurality of different constant rate factors may be selected within a preset range; and video compression is respectively performed on the original video samples using the plurality of different constant rate factors to obtain the target video samples of a plurality of resolutions, to implement the augmentation of the training data set. CRF may be randomly selected, and in general, the preset range of CRF may be [20, 35].

S602. Determine a low-resolution sample set according to the target video samples.

After the target video samples are obtained, video frame extraction may be performed on the target video samples, and first images at preset frame positions are extracted from the target video samples, thereby obtaining a plurality of frames of first images to form the low-resolution sample set. This embodiment does not limit the preset frame positions, that is, does not limit the video frame extraction method. For example, the video frame extraction method may be to extract a frame every 1 s from the target video samples. That is, the preset frame positions are a video frame corresponding to the 1 s, a video frame corresponding to the 2 s, a video frame corresponding to the 3 s, . . . , and a video frame corresponding to the Ns in the target video samples. N is a total length of the target video samples.

Figure 7:
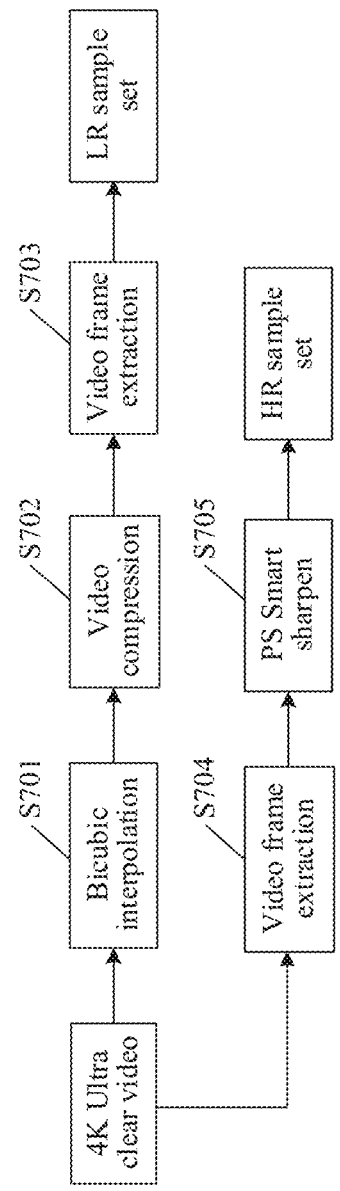
FIG. 7 is a flowchart of constructing a low-resolution sample set and a high-resolution sample set according to an embodiment of this application.

Taking the original video samples being 4K ultra-high-definition videos as an example, a flowchart of constructing a low-resolution sample set and a high-resolution sample set may be seen in FIG. 7. The bicubic interpolation (S701) is performed on the 4K ultra-high-definition videos, and the video compression (S702) is performed on results after the bicubic interpolation to obtain the target video samples. Next, video frame extraction (S703) is performed on the target video samples to obtain an LR sample set.

S603: Perform contour enhancement on a plurality of frames of second images at the preset frame positions in the original video samples to obtain a high-resolution sample set In an actual degradation scenario, it is difficult to determine the sequence of down-sampling and image blurring. If the original video samples are subject to down-sampling, image blurring, and noise, and adding blurring to low-resolution samples is equivalent to making the model have a contour enhanced capability, for the convenience of dataset construction, the blurring during the production of low-resolution samples may be removed, and this degradation is simulated by performing appropriate contour enhancement on the high-resolution images.

Since S601 to S603 simulate how the high-resolution images degenerate to obtain the corresponding low-resolution images, each first image in the low-resolution sample set is to have a corresponding image in the high-resolution sample set. However, the first image is an image located at a preset frame position in the target video sample. In this case, an image in the high-resolution sample set is also to be obtained according to a second image at the preset frame position in the original video samples. Therefore, in this embodiment, contour enhancement may be performed on a plurality of frames of second images at the preset frame positions in the original video samples to obtain a high-resolution sample set. That is, if the target video samples are extracted every is to obtain a low-resolution sample set, in the process of obtaining the high-resolution sample set, the original video samples also need to be extracted every 1 s, to obtain a plurality of frames of second images.

There may be various manners of contour enhancement, and in this embodiment, contour enhancement may be implemented through smart sharpening by image processing software (Adobe Photoshop, PS).

Still referring to FIG. 7, taking the foregoing original video samples being 4K ultra-high-definition videos as an example, video frame extraction is performed on the 4K ultra-high-definition videos (S704) to obtain a plurality of frames of second images. PS smart sharpening (S705) is performed on the plurality of frames of second images to obtain an HR sample set.

S604: Construct a training data set according to the low-resolution sample set and the high-resolution sample set.

In this embodiment, there may be many various manners of constructing a training data set according to the low-resolution sample set and the high-resolution sample set. One construction manner may be to directly use the low-resolution sample set and the high-resolution sample set as the training data set to train the resolution reconstruction model.

Generally, in the process of learning resolution reconstruction, the resolution reconstruction model mainly learns how to reconstruct high-frequency details. Since the images in the LR sample set and the HR sample set always have more or fewer flat regions with less texture details. For example, an image shown in 801 in FIG. 8 includes blue sky, lake surface, mountains, houses, trees, boats, and the like. There are very few texture details in regions such as blue sky and lake surface, which may be considered as flat regions. These parts are of no practical help to the training of the resolution reconstruction model. To reduce the interference of these parts on the training of the resolution reconstruction model, w % ben constructing the training data set, one step operation may be performed on the LR sample set and the HR sample set, and the flat regions are removed. Only the parts with rich texture details are reserved for training.

Based on this, another construction manner may be to respectively segment the plurality of frames of third images according to a first size, to obtain label images, and respectively segment the plurality of frames of first images according to a second size, to obtain input images. The first size and the second size may be resolution sizes, and the first size may be an integer multiple of the second size. The multiple relationship between the first size and the second size affects the resolution magnification that the resolution reconstruction model can achieve when the resolution reconstruction of low-resolution images is performed during the training process, and the resolution magnification that the resolution reconstruction model can achieve when the resolution reconstruction of the to-be-processed video frame is performed during the use process, that is, the magnification of the second resolution relative to the first resolution. If the first size is 64×64 and the second size is 32×32, the trained resolution reconstruction model can achieve double super-resolution, that is, when the resolution reconstruction model is used for resolution reconstruction, the second resolution of the initial reconstructed video frame is upscaled by a factor of two relative to the first resolution of the to-be-processed video frame sequence.

Since each frame of third image is segmented according to the first size, each frame of third image corresponds to a plurality of label images obtained by segmentation. For label images corresponding to each third image in the plurality of frames of third images, target label images belonging to a flat region of the third image are determined from the label images; and the target label images are removed. Each frame of first image is also segmented, each frame of first image respectively corresponds to the third image, and the segmented label images and the input images also have a correspondence. Therefore, the input images corresponding to the target label images may be further removed, and the remaining label images and input images are used as the training data set.

In this embodiment, the data in the HR sample set and the LR sample set are screened. The training data set is constructed by removing redundant parts lacking texture details such as flat regions, so that the resolution reconstruction model can focus on the learning of high-frequency details, which guarantees efficient training of the resolution reconstruction model.

In a possible implementation, the manner of determining target label images belonging to a flat region of the third image may be to generate a corresponding initial operator image according to the third image. The initial operator image may reflect a pixel value of each pixel, and the pixel value may reflect the possibility that the pixel is a high-frequency detail point. The larger the pixel value, the more likely the pixel is to be a high-frequency detail point. If the pixel value is small enough, for example, smaller than a first threshold, it may be considered that the pixel is not a high-frequency detail point. Therefore, pixel values of pixels whose pixel values are less than a first threshold in the initial operator image are reassigned to zero to obtain a target operator image. The target operator image is segmented according to the first size to obtain operator sub-images of the target operator image, the operator sub-images being in one-to-one correspondence to the label images of the third image. Each operator sub-image includes a plurality of pixels. If quantities of pixels with non-zero pixel values in the operator sub-images do not exceed a second threshold, it means that there are very few pixels belonging to high frequency details in the operator sub-image, and it may be considered that the label image corresponding to the operator sub-image is a flat region. It is determined that the label images corresponding to the operator sub-images are the target label images.

The initial operator image may be generated by performing Gaussian blurring on the third image, for example, a standard deviation. σ=1.5 and a radius. r=5 are used for Gaussian blurring, and an initial operator image is obtained from an image after Gaussian blurring. The initial operator image may be obtained by a variety of algorithms, for example, taking a first-order Sobel operator, a Roberts operator, and a Laplacian operator from the image after Gaussian blurring. This is not limited in this embodiment.

The first threshold ($t_1$) and the second threshold ($t_2$) may be set based on experience, for example, $t_1$==60, $t_2$=60. That is, pixel values of pixels whose pixel values are less than $t_1$ in the initial operator image are reassigned to 0 to obtain a target operator image. If quantities of pixels with non-zero pixel values in the operator sub-images corresponding to the label image ≤$t_2$, it is considered that the label image belongs to the flat region of the entire third image, that is, the target label image. The target label image and the corresponding input image are then discarded.

Figure 8:
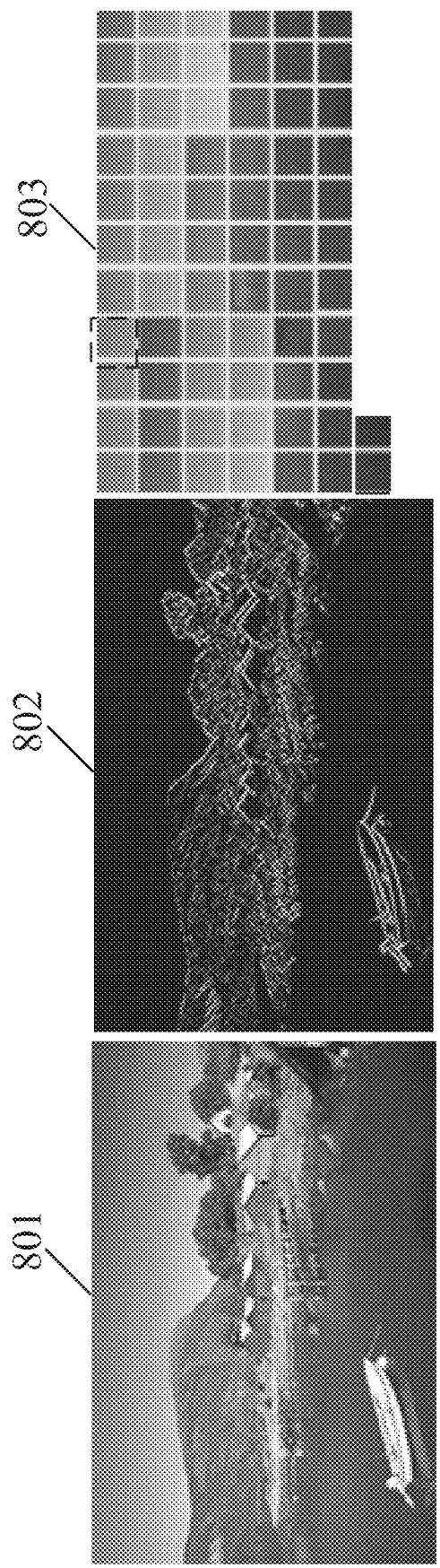
FIG. 8 is a schematic diagram of a third image, a target operator image, and removed target label images according to an embodiment of this application.

Taking the image shown in 801 in FIG. 8 being the third image as an example, the target operator image corresponding to the generated third image is shown in 802. The white pixels in 802 are high-frequency details such as mountains, houses, trees, and ships. According to the foregoing method, the third image may be segmented into a plurality of label images, and the target operator image may be segmented in the same manner to obtain operator sub-images corresponding to the label images respectively. According to each operator sub-image, the target label images belonging to the flat region may be determined, and the target label images are removed. The removed target label images may be seen in 803. Each small image in 803 represents a target label image (for example, an image identified by the dotted box in 803), and the removed target label images are basically corresponding images such as the sky (for example, the image identified by the dotted line in 803) and the lake.

S605: Train an initial reconstruction model according to the training data set to obtain the resolution reconstruction model.

The initial reconstruction model may be trained according to the training data set. The initial reconstruction model performs resolution reconstruction according to the first images in the training data set or the input images determined according to the first images, and outputs the initial reconstructed video frame. The first images or the input images are equivalent to the to-be-processed video frames during the use of the resolution reconstruction model. A loss function is constructed by using the initial reconstructed video frame and the label image, to adjust parameters of the initial reconstruction model according to the loss function until the value of the loss function is the smallest.

The constructed loss function may be a L1 loss function, that is, the label image is used as a target value .$Y_i$, and the outputted initial reconstructed video frame is used as an estimated value. A sum .S of an absolute difference between the target value $Y_i$ and the estimated value $f(x_i)$ is minimized. The specific formula is as follows:

$$S = \sum_{i=1}^{n} |Y_i - f(X_i)|, \tag{5}$$

where S is the L1 loss function, .$Y_i$ is the target value, $f(X_i)$ is the estimated value, and $X_i$ is the input image.

Although the L1 loss function is used in the training process in this embodiment, since the HR images (the third images) in the training data set are obtained through contour enhancement, the resolution reconstruction model obtained through training has the contour enhancement capability, so that the resolution reconstruction model can output the initial reconstructed video frames with clearer high-frequency details, avoiding the problem that the initial reconstructed video frames tend to be averaged, blurred, and over-smoothed.

In the training process, the batch is set to 16, and the initial learning rate is set to $1\times10^{-4}$. After each batch training of $2\times10^5$, the learning rate is correspondingly halved. The resolution reconstruction model uses an adaptive moment estimation (Adam) optimizer, and parameters of the Adam optimizer are set to $\beta_1=0.9$, $\beta_2=0.999$, and $\varepsilon=10^{-8}$. The DIV2K (a data set) validation set is used to guide the entire training process. After the entire training data set is iterated for 60 rounds, the performance of the initial reconstructed model on the validation set basically stops changing. The training is stopped, and an initial reconstruction model with the best performance on the validation set is selected as a final resolution reconstruction model.

When the training data set is constructed, the compression noise caused by video coding is considered, so that the degradation scenario is closer to the real online scenario, which improves the generalization effect of the resolution reconstruction model. For the real online super-resolution reconstruction scenario, a better resolution reconstruction effect can be achieved, that is, the obtained initial reconstructed video frame is better than the related art. In addition, due to the contour enhancement of the original video samples, the resolution reconstruction model is endowed with contour enhancement and the capability to generate richer high-frequency details.

Figure 9:
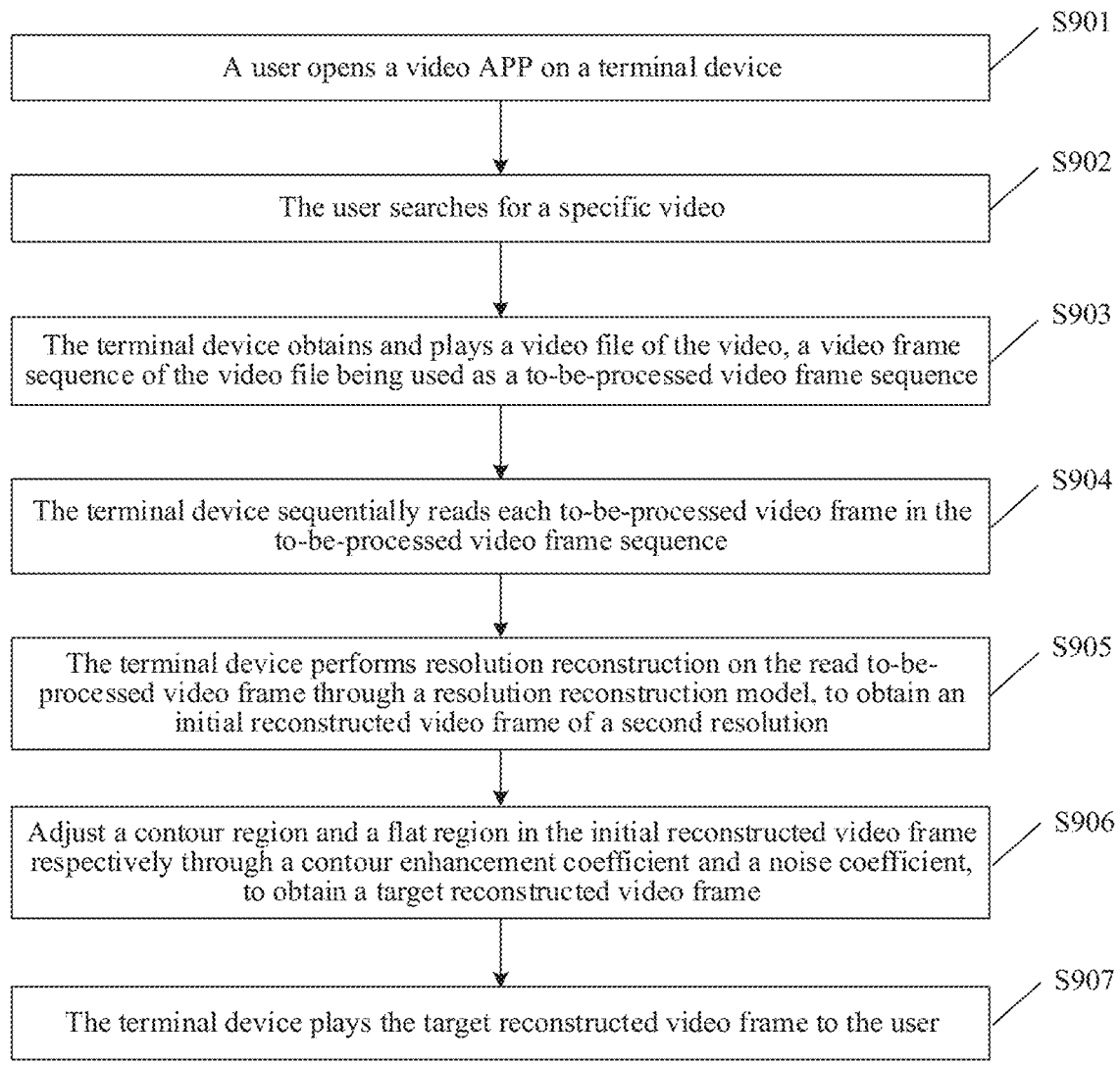
FIG. 9 is a flowchart of an artificial intelligence-based super-resolution reconstruction method according to an embodiment of this application.

Next, the artificial intelligence-based super-resolution reconstruction method provided in the embodiments of this application is described with reference to an actual application scenario. The application scenario may be that a user watches a video through a video APP. To improve the speed at which the server end transmits the video to the terminal device, relieve the pressure of network transmission, and the like, the resolution of the video file provided by the server end to the terminal device may be relatively low, and the video may not be clear. After receiving the video file, the terminal device may perform super-resolution reconstruction on the video file to improve the resolution and clarity of the video file for the user to watch. Referring to FIG. 9, the method includes the following steps:

S901: A user opens a video APP on a terminal device.

S902: The user searches for a specific video.

S903: The terminal device obtains and plays a video file of the video, a video frame sequence of the video file being used as a to-be-processed video frame sequence.

S904: The terminal device sequentially reads each to-be-processed video frame in the to-be-processed video frame sequence.

S905: The terminal device performs resolution reconstruction on the read to-be-processed video frame through a resolution reconstruction model, to obtain an initial reconstructed video frame of a second resolution.

S906: Adjust a contour region and a flat region in the initial reconstructed video frame respectively through a contour enhancement coefficient and a noise coefficient, to obtain a target reconstructed video frame.

S907: The terminal device plays the target reconstructed video frame to the user.

Figure 10:
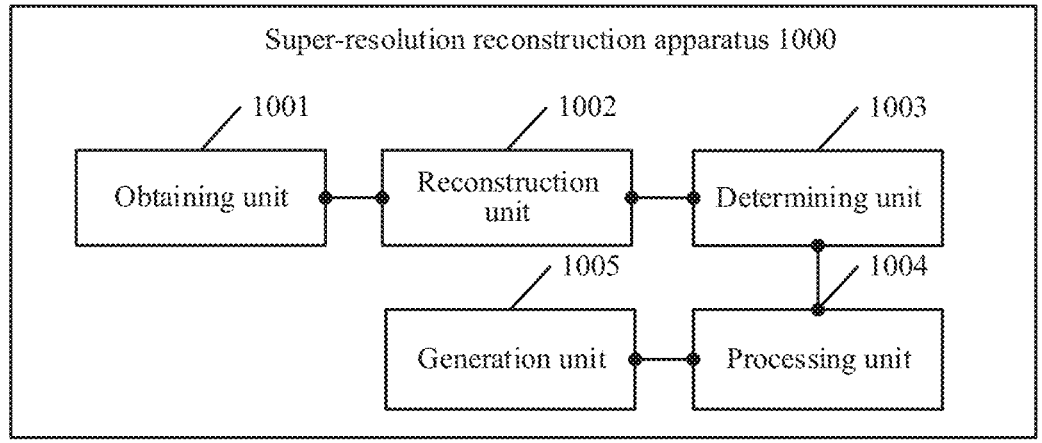
FIG. 10 is a structural diagram of an artificial intelligence-based super-resolution reconstruction apparatus according to an embodiment of this application.

Based on the embodiment corresponding to FIG. 2 above, an embodiment of this application further provides an artificial intelligence-based super-resolution reconstruction apparatus. Referring to FIG. 10, the apparatus includes an obtaining unit 1001, a reconstruction unit 1002, a determining unit 1003, a processing unit 1004, and a generation unit 1005:

the obtaining unit 1001 being configured to obtain a to-be-processed video frame sequence of a first resolution;

the reconstruction unit 1002 being configured to perform, for each to-be-processed video frame in the to-be-processed video frame sequence, resolution reconstruction on the to-be-processed video frame according to a resolution reconstruction model, to obtain an initial reconstructed video frame of a second resolution, the second resolution being greater than the first resolution;

the determining unit 1003 being configured to determine a contour region in the initial reconstructed video frame;

the processing unit 1004 being configured to perform contour enhancement on the contour region to obtain a target reconstructed video frame; and the generation unit 1005 being configured to generate a reconstructed video frame sequence of the second resolution according to the target reconstructed video frames.

In a possible implementation, the determining unit 1003 is configured to determine the contour region and a flat region in the initial reconstructed video frame in a residual separation manner; and the processing unit 1004 is configured to perform contour enhancement on the contour region and perform denoising on the flat region, to obtain the target reconstructed video frame.

In a possible implementation, the determining unit 1003 is configured to obtain, for each to-be-processed video frame in the to-be-processed video frame sequence, a bicubic interpolation magnification result through bicubic interpolation;

perform residual separation according to the initial reconstructed video frame corresponding to the to-be-processed video frame and the bicubic interpolation magnification result to obtain a high-frequency mask and a low-frequency mask; and determine the contour region according to the initial reconstructed video frame, the bicubic interpolation magnification result, and the high-frequency mask, and determine the flat region according to the initial reconstructed video frame, the bicubic interpolation magnification result, and the low-frequency mask.

In a possible implementation, the obtaining unit 1001 is configured to:

obtain a video playback instruction;

play a video file corresponding to the to-be-processed video frame sequence according to the video playback instruction; and in accordance with a detection (e.g., determination) of a resolution switching instruction of the video file, and detection (e.g., determination) of a switched resolution indicated by the resolution switching instruction is associated with (e.g., specifies) the second resolution, trigger the reconstruction unit 1002 to perform, for each to-be-processed video frame in the to-be-processed video frame sequence, resolution reconstruction on the to-be-processed video frame according to a resolution reconstruction model, to obtain an initial reconstructed video frame of a second resolution.

In a possible implementation, the apparatus further includes a playback unit, configured to:

determine a next video frame of a currently played video frame;

determine a target reconstructed video frame corresponding to the next video frame in the reconstructed video frame sequence; and switch to the target reconstructed video frame corresponding to the next video frame when the next video frame is played, and play the target reconstructed video frame in the reconstructed video frame sequence.

In a possible implementation, the apparatus further includes a training unit, configured to:

perform down-sampling and video compression on acquired original video samples to obtain target video samples, resolutions of the original video samples being greater than a preset threshold;

determine a low-resolution sample set according to the target video samples, the low-resolution sample set including a plurality of frames of first images at preset frame positions in the target video samples;

perform contour enhancement on a plurality of frames of second images at the preset frame positions in the original video samples to obtain a high-resolution sample set, the high-resolution sample set including a plurality of frames of third images, the plurality of frames of third images being the plurality of frames of second images after contour enhancement;

construct a training data set according to the low-resolution sample set and the high-resolution sample set; and train an initial reconstruction model according to the training data set to obtain the resolution reconstruction model.

In a possible implementation, the training unit is configured to:

respectively segment the plurality of frames of third images according to a first size, to obtain label images, and respectively segment the plurality of frames of first images according to a second size, to obtain input images;

for label images corresponding to each third image in the plurality of frames of third images, determine target label images belonging to a flat region of the third image from the label images; and remove the target label images and input images corresponding to the target label images.

In a possible implementation, the training unit is configured to:

generate a corresponding initial operator image according to the third image;

reassign pixel values of pixels whose pixel values are less than a first threshold in the initial operator image to zero to obtain a target operator image;

segment the target operator image according to the first size to obtain operator sub-images of the target operator image, the operator sub-images being in one-to-one correspondence to the label images of the third image; and in accordance with a determination that quantities of pixels with non-zero pixel values in the operator sub-images do not exceed a second threshold, determine that the label images corresponding to the operator sub-images are the target label images.

In a possible implementation, the training unit is configured to:

select a plurality of different constant rate factors within a preset range; and respectively perform video compression on the original video samples using the plurality of different constant rate factors to obtain the target video samples of a plurality of resolutions.

In a possible implementation, the reconstruction unit 1002 is configured to:

perform residual extraction on the to-be-processed video frame at least twice by using the resolution reconstruction model to obtain residual extraction results; and perform resolution reconstruction on the to-be-processed video frame based on the residual extraction results, to obtain the initial reconstructed video frame of the second resolution.

In a possible implementation, the reconstruction unit 1002 is configured to:

perform convolution processing on the to-be-processed video frame by using a convolution layer in the resolution reconstruction model to obtain convolution processing results corresponding to the to-be-processed video frame; and sequentially perform residual extraction by using residual blocks in a backbone based on the convolution processing results to obtain the residual extraction results of the residual blocks, the residual blocks being cascaded.

In a possible implementation, the reconstruction unit 1002 is configured to:

concatenate the residual extraction results by using a concatenation layer to obtain residual concatenation features;

perform feature fusion on the residual concatenation features to obtain a fused feature map; and perform up-sampling on the fused feature map to obtain the initial reconstructed video frame of the second resolution, the initial reconstructed video frame being corresponding to the to-be-processed video frame.

Figure 11:
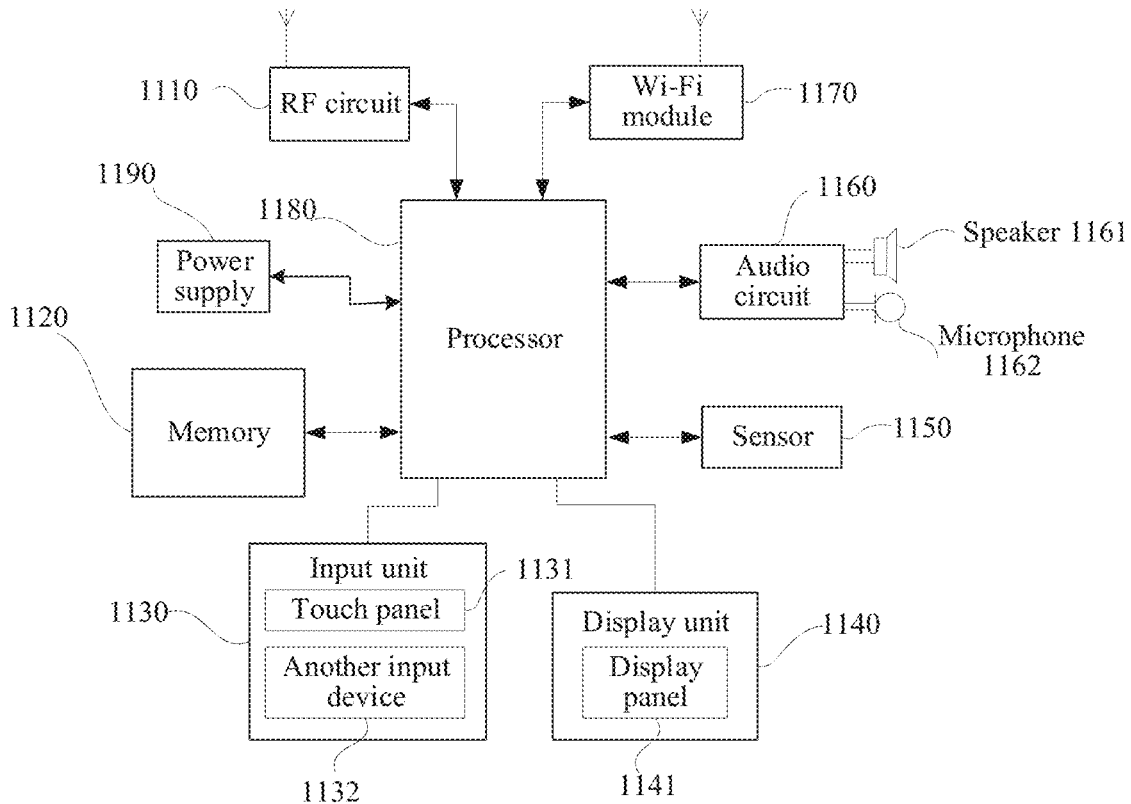
FIG. 11 is a structural diagram of a terminal device according to an embodiment of this application.

An embodiment of this application further provides a device, and the device may be configured to perform the artificial intelligence-based super-resolution reconstruction method. The device is described below with reference to the accompanying drawings. Referring to FIG. 11, an embodiment of this application provides a device, and the device may alternatively be a terminal device. The terminal device may be a computer, a tablet computer, a mobile phone, a personal digital assistant (PDA), a point of sales (POS), an on-board computer, or the like. The terminal device being a mobile phone is used as an example.

FIG. 11 is a block diagram of a structure of a part of a mobile phone related to a terminal device according to an embodiment of this application. Referring to FIG. 11, the mobile phone includes components such as a radio frequency (RF) circuit 1110, a memory 1120, an input unit 1130, a display unit 1140, a sensor 1150, an audio circuit 1160, a wireless fidelity (Wi-Fi) module 1170, a processor 1180, and a power supply 1190. A person skilled in the art may understand that the structure of the mobile phone shown in FIG. 11 does not constitute a limitation on the mobile phone, and the mobile phone may include more components or fewer components than those shown in the figure, or some components may be combined, or a different component deployment may be used.

The components of the mobile phone are described in detail below with reference to FIG. 11.

The RF circuit 1110 may be configured to send and receive a signal in an information receiving and sending process or a call process, and in particular, after downlink information of a base station is received, send the downlink information to the processor 1180 for processing. In addition, the RF circuit transmits uplink data to the base station. Generally, the RF circuit 1110 includes, but not limited to, an antenna, at least one amplifier, a transceiver, a coupler, a low noise amplifier (LNA), and a duplexer. In addition, the RF circuit 1110 may also communicate with a network and another device by wireless communication. The wireless communication may use any communication standard or protocol, including, but not limited to a Global System for Mobile communications (GSM), a general packet radio service (GPRS), code division multiple access (CDMA), wideband code division multiple access (WCDMA), Long Term Evolution (LTE), an email, a short messaging service (SMS), and the like.

The memory 1120 may be configured to store a software program and module. The processor 1180 runs the software program and module stored in the memory 1120, to implement various functional applications and data processing of the mobile phone. The memory 1120 may mainly include a program storage area and a data storage area. The program storage area may store an operating system, an application program required by at least one function (such as a sound playback function and an image display function), and the like. The data storage area may store data (for example, audio data and a phone book) created according to use of the mobile phone. In addition, the memory 1120 may include a high speed random access memory, and may further include a non-volatile memory, such as at least one magnetic disk storage device, a flash memory device or other non-volatile solid state storage devices.

The input unit 1130 may be configured to receive input digit or character information, and generate a keyboard signal input related to the user setting and function control of the mobile phone. Specifically, the input unit 1130 may include a touch panel 1131 and another input device 1132. The touch panel 1131, which may also be referred to as a touchscreen, may be configured to collect a touch operation of a user on or near the touch panel (such as an operation of a user on or near the touch panel 1131 by using any suitable object or accessory, such as a finger or a stylus), and drive a corresponding connection apparatus according to a preset program. In some embodiments, the touch panel 1131 may include two parts: a touch detection apparatus and a touch controller. The touch detection apparatus detects a touch position of the user, detects a signal generated by the touch operation, and transfers the signal to the touch controller. The touch controller receives touch information from the touch detection apparatus, converts the touch information into a contact coordinate, then transmits the contact coordinate to the processor 1180, and receives and executes a command transmitted by the processor 1180. In addition, the touch panel 1131 may be implemented by using various types, such as a resistive type, a capacitive type, an infrared type, and a surface acoustic wave type. In addition to the touch panel 1131, the input unit 1130 may further include the another input device 1132. Specifically, the another input device 1132 may include, but is not limited to, one or more of a physical keyboard, a functional key (such as a volume control key or a switch key), a track ball, a mouse, and a joystick.

The display unit 1140 may be configured to display information inputted by the user or information provided for the user, and various menus of the mobile phone. The display unit 1140 may include a display panel 1141. In some embodiments, the display panel 1141 may be configured in the form of a liquid crystal display (LCD), an organic light-emitting diode (OLED), or the like. Further, the touch panel 1131 may cover the display panel 1141. After detecting a touch operation on or near the touch panel, the touch panel 1131 transfers the touch operation to the processor 1180, to determine a type of a touch event. Then, the processor 1180 provides a corresponding visual output on the display panel 1141 according to the type of the touch event. Although in FIG. 11, the touch panel 1131 and the display panel 1141 are used as two separate parts to implement input and output functions of the mobile phone, in some embodiments, the touch panel 1131 and the display panel 1141 may be integrated to implement the input and output functions of the mobile phone.

The mobile phone may further include at least one sensor 1150 such as an optical sensor, a motion sensor, and other sensors. Specifically, the optical sensor may include an ambient light sensor and a proximity sensor, where the ambient light sensor may adjust luminance of the display panel 1141 according to the luminance of the ambient light, and the proximity sensor may switch off the display panel 1141 and/or backlight when the mobile phone is moved to the ear. As one type of motion sensor, an acceleration sensor can detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the mobile phone, are not further described herein.

The audio circuit 1160, a speaker 1161, and a microphone 1162 may provide audio interfaces between the user and the mobile phone. The audio circuit 1160 may transmit, to the speaker 1161, an electrical signal obtained by converting received audio data, and the speaker 1161 converts the electrical signal into a voice signal for outputting. In addition, the microphone 1162 converts a collected sound signal into an electrical signal. After receiving the electrical signal, the audio circuit 1160 converts the electrical signal into audio data, and then outputs the audio data. After being processed by the processor 1180, the audio data is transmitted through the RF circuit 1110 to, for example, another mobile phone or the audio data is outputted to the memory 1120 for further processing.

Wi-Fi belongs to a short distance wireless transmission technology. The mobile phone may help, by using the Wi-Fi module 1170, a user to receive and transmit an email, browse a web page, access stream media, and the like. This provides wireless broadband Internet access for the user. Although FIG. 11 shows the Wi-Fi module 1170, the Wi-Fi module is not a necessary component of the mobile phone, and the Wi-Fi module may be omitted as required provided that the scope of the essence of the present disclosure is not changed.

The processor 1180 is a control center of the mobile phone, and is connected to various parts of the entire mobile phone by using various interfaces and lines. By running or executing a software program and/or module stored in the memory 1120, and invoking data stored in the memory 1120, the processor executes various functions of the mobile phone and performs data processing, thereby monitoring the entire mobile phone. In some embodiments, the processor 1180 may include one or more processing units. Preferably, the processor 1180 may integrate an application processor and a modem processor. The application processor mainly processes an operating system, a user interface, an application, and the like. The modem processor mainly processes wireless communication. It may be understood that the foregoing modem processor may alternatively not be integrated into the processor 1180.

The mobile phone further includes the power supply 1190 (such as a battery) for supplying power to the components. Preferably, the power supply may be logically connected to the processor 1180 by using a power management system, thereby implementing functions such as charging, discharging, and power consumption management by using the power management system.

Although not shown in the figure, the mobile phone may further include a camera, a Bluetooth module, and the like. Details are not described herein again.

In this embodiment, the processor 1180 included in the terminal device further has the following functions:

obtaining a to-be-processed video frame sequence of a first resolution;

performing, for each to-be-processed video frame in the to-be-processed video frame sequence, resolution reconstruction on the to-be-processed video frame according to a resolution reconstruction model, to obtain an initial reconstructed video frame of a second resolution, the second resolution being greater than the first resolution;

determining a contour region in the initial reconstructed video frame;

performing contour enhancement on the contour region to obtain a target reconstructed video frame; and generating a reconstructed video frame sequence of the second resolution according to the target reconstructed video frames.

Figure 12:
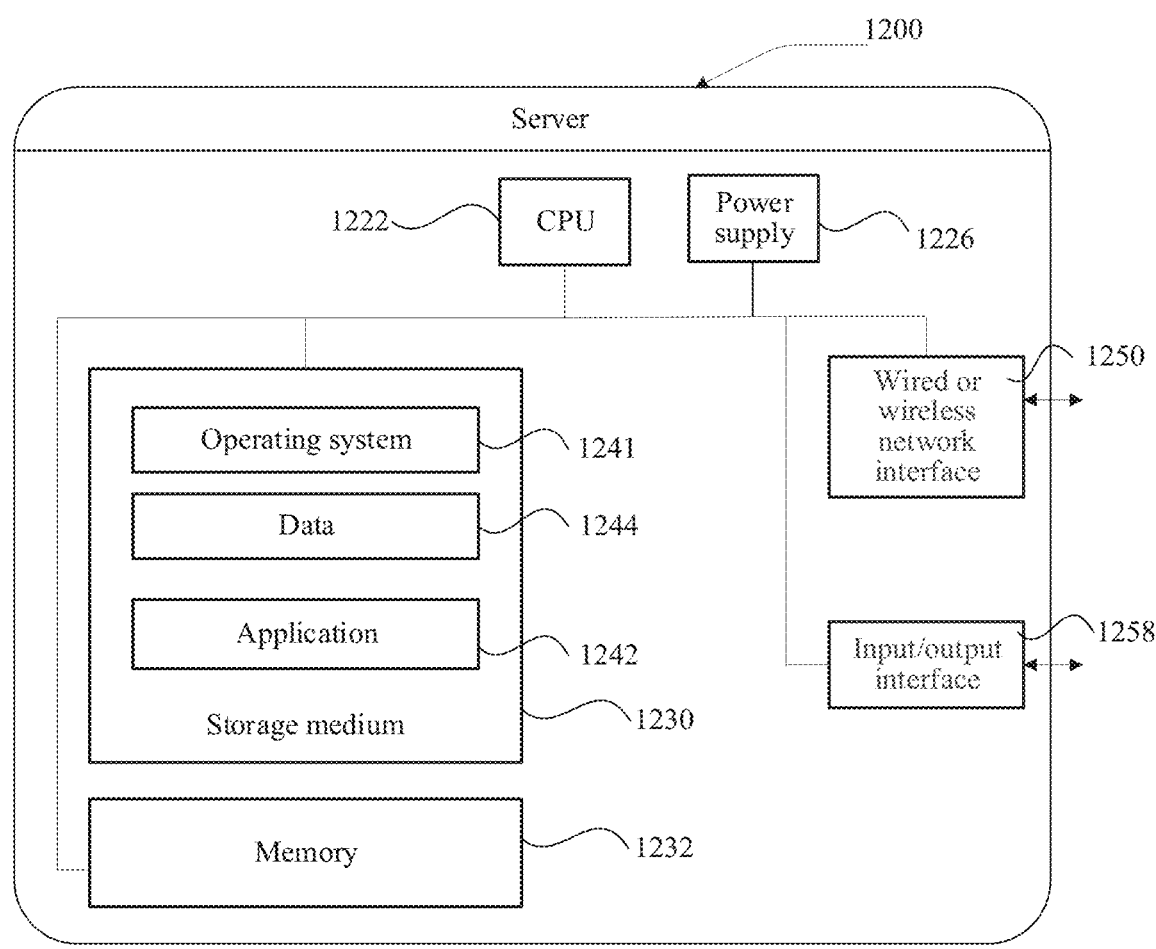
FIG. 12 is a structural diagram of a server according to an embodiment of this application.

An embodiment of this application further provides a server. FIG. 12 is a structural diagram of a server 1200 according to an embodiment of this application. The server 1200 may vary greatly due to different configurations or performance, and may include one or more central processing units (CPUs) 1222 (for example, one or more processors) and a memory 1232, and one or more storage media 1230 (for example, one or more mass storage devices) that store application programs 1242 or data 1244. The memory 1232 and the storage medium 1230 may implement transient storage or permanent storage. The programs stored in the storage media 1230 may include one or more modules (not shown in the figure), and each module may include a series of instructions to the server. Further, the CPU 1222 may be configured to communicate with the storage medium 1230, and perform, on the server 1200, the series of instruction operations in the storage medium 1230.

The server 1200 may further include one or more power supplies 1226, one or more wired or wireless network interfaces 1250, one or more input/output interfaces 1258, and/or one or more operating systems 1241 such as Windows Server™, Mac OS X™, Unix™, Linux™, or Free-BSD™.

The steps performed by the server in the foregoing embodiments may be performed based on the server structure shown in FIG. 12.

An embodiment of this application further provides a non-transitory computer-readable storage medium, configured to store program code, the program code being used for performing the method according to the foregoing embodiments.

An embodiment of this application further provides a computer program product including instructions, the instructions, when being run on a computer, causing the computer to perform the method according to the foregoing embodiments.

In the several embodiments provided in this application, the disclosed system, apparatus, and method may be implemented in other manners. For example, the described apparatus embodiment is merely exemplary. For example, the unit division is merely a logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate components may or may not be physically separated, and the components displayed as units may or may not be physical units, and may be located in one place or may be distributed over a plurality of network units. Some or all of the units may be selected according to actual needs to achieve the objectives of the solutions of the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the related art, or all or a part of the technical solutions may be implemented in the form of a software product. The computer software product is stored in a storage medium and includes several instructions for instructing a computer device (which may be a PC, a server, or a network device) to perform all or some of the steps of the method described in the embodiments of this application. The foregoing storage medium includes: any medium that can store program code, such as a USB flash drive, a removable hard disk, a read-only memory (ROM), a random access memory (RAM), a magnetic disk, or an optical disk.

The foregoing embodiments are merely intended for describing the technical solutions of this application, but not for limiting this application. It should be understood by a person of ordinary skill in the art that although this application has been described in detail with reference to the foregoing embodiments, modifications can be made to the technical solutions described in the foregoing embodiments, or equivalent replacements can be made to some technical features in the technical solutions, without departing from the spirit and scope of the technical solutions of the embodiments of this application.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

As used herein, the term "unit" or "module" refers to a computer program or part of the computer program that has a predefined function and works together with other related parts to achieve a predefined goal and may be all or partially implemented by using software, hardware (e.g., processing circuitry and/or memory configured to perform the pre-defined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. The division of the foregoing functional modules is merely used as an example for description when the systems, devices, and apparatus provided in the foregoing embodiments performs video reconstruction and/or training the reconstruction model. In practical application, the foregoing functions may be allocated to and completed by different functional modules according to requirements, that is, an inner structure of a device is divided into different functional modules to implement all or a part of the functions described above.

What is claimed is:

1. An artificial intelligence-based super-resolution reconstruction method performed by a terminal device, the method comprising:
    obtaining a to-be-processed video frame sequence of a first resolution, the to-be-processed video frame sequence including a plurality of to-be-processed video frames;
    for each to-be-processed video frame in the to-be-processed video frame sequence:
        performing resolution reconstruction according to a resolution reconstruction model so as to obtain an initial reconstructed video frame of a second resolution, wherein the second resolution is greater than the first resolution;
        determining a contour region and a flat region in the initial reconstructed video frame according to a residual separation method; and
        performing contour enhancement on the contour region and denoising on the flat region to obtain a target reconstructed video frame; and
    generating a reconstructed video frame sequence of the second resolution according to a plurality of target reconstructed video frames corresponding to the plurality of to-be-processed video frames.

2. The method according to claim 1, wherein determining a contour region and a flat region in the initial reconstructed video frame according to a residual separation method comprises:
    obtaining, for each to-be-processed video frame in the to-be-processed video frame sequence, a bicubic interpolation magnification result through bicubic interpolation;
    performing residual separation according to the initial reconstructed video frame corresponding to the to-be-processed video frame and the bicubic interpolation magnification result to obtain a high-frequency mask and a low-frequency mask;
    determining the contour region according to the initial reconstructed video frame, the bicubic interpolation magnification result, and the high-frequency mask; and
    determining the flat region according to the initial reconstructed video frame, the bicubic interpolation magnification result, and the low-frequency mask.

3. The method according to claim 1, wherein obtaining the to-be-processed video frame sequence of the first resolution comprises:
    obtaining a video playback instruction;
    playing a video file corresponding to the to-be-processed video frame sequence according to the video playback instruction; and
    in accordance with a detection of a resolution switching instruction of the video file, the switching instruction including specification of a second resolution:
        for each to-be-processed video frame in the to-be-processed video frame sequence, performing resolution reconstruction on the to-be-processed video frame according to a resolution reconstruction model, to obtain an initial reconstructed video frame of a second resolution.

4. The method according to claim 1, further comprising: after generating the reconstructed video frame sequence of the second resolution:
    determining a next video frame of a currently played video frame;
    determining a target reconstructed video frame corresponding to the next video frame in the reconstructed video frame sequence;
    switching to the target reconstructed video frame corresponding to the next video frame when the next video frame is played; and
    playing the target reconstructed video frame in the reconstructed video frame sequence.

5. The method according to claim 1, further comprising: obtaining the resolution reconstruction model through training, the training comprising:
    performing down-sampling and video compression on acquired original video samples to obtain target video samples, the original video samples having respective resolutions that are greater than a preset threshold;
    determining a low-resolution sample set according to the target video samples, the low-resolution sample set comprising a plurality of frames of first images at preset frame positions in the target video samples;
    performing contour enhancement on a plurality of frames of second images at the preset frame positions in the original video samples to obtain a high-resolution sample set, the high-resolution sample set comprising a plurality of frames of third images, the plurality of frames of third images being the plurality of frames of second images after contour enhancement;
    constructing a training data set according to the low-resolution sample set and the high-resolution sample set; and
    training an initial reconstruction model according to the training data set to obtain the resolution reconstruction model.

6. The method according to claim 5, wherein constructing the training data set comprises:
    respectively segmenting the plurality of frames of third images according to a first size, to obtain label images, and respectively segmenting the plurality of frames of first images according to a second size, to obtain input images;
    for label images corresponding to each third image in the plurality of frames of third images, determining target label images belonging to a flat region of the third image from the label images; and
    removing the target label images and input images corresponding to the target label images.

7. The method according to claim 6, wherein determining the target label images belonging to a flat region of the third image from the label images comprises:
    generating a corresponding initial operator image according to the third image;
    reassigning pixel values of pixels whose pixel values are less than a first threshold in the initial operator image to zero to obtain a target operator image;

segmenting the target operator image according to the first size to obtain operator sub-images of the target operator image, the operator sub-images being in one-to-one correspondence to the label images of the third image; and in accordance with a determination that quantities of pixels with non-zero pixel values in the operator sub-images do not exceed a second threshold, determining that the label images corresponding to the operator sub-images are the target label images.

8. The method according to claim 5, wherein performing the video compression on acquired original video samples comprises:

selecting a plurality of different constant rate factors within a preset range; and respectively performing video compression on the original video samples using the plurality of different constant rate factors to obtain the target video samples of a plurality of resolutions.

9. The method according to claim 1, wherein performing the resolution reconstruction comprises:

performing residual extraction on the to-be-processed video frame at least twice by using the resolution reconstruction model to obtain residual extraction results; and performing resolution reconstruction on the to-be-processed video frame based on the residual extraction results, to obtain the initial reconstructed video frame of the second resolution.

10. The method according to claim 9, wherein performing the residual extraction on the to-be-processed video frame comprises:

performing convolution processing on the to-be-processed video frame by using a convolution layer in the resolution reconstruction model to obtain convolution processing results corresponding to the to-be-processed video frame; and sequentially performing residual extraction by using residual blocks in a backbone based on the convolution processing results to obtain the residual extraction results of the residual blocks, the residual blocks being cascaded.

11. The method according to claim 9, wherein performing the resolution reconstruction on the to-be-processed video frame based on the residual extraction results, to obtain the initial reconstructed video frame of the second resolution comprises:

concatenating the residual extraction results by using a concatenation layer to obtain residual concatenation features;

performing feature fusion on the residual concatenation features to obtain a fused feature map; and performing up-sampling on the fused feature map to obtain the initial reconstructed video frame of the second resolution, the initial reconstructed video frame corresponding to the to-be-processed video frame.

12. A computing device, comprising:
one or more processors; and
memory storing one or more programs, the one or more programs comprising instructions that, when executed by the one or more processors, cause the one or more processors to perform operations comprising:
obtaining a to-be-processed video frame sequence of a first resolution, the to-be-processed video frame sequence including a plurality of to-be-processed video frames;

for each to-be-processed video frame in the to-be-processed video frame sequence:
performing resolution reconstruction according to a resolution reconstruction model so as to obtain an initial reconstructed video frame of a second resolution, wherein the second resolution is greater than the first resolution;
determining a contour region and a flat region in the initial reconstructed video frame according to a residual separation method; and
performing contour enhancement on the contour region and denoising on the flat region to obtain a target reconstructed video frame; and
generating a reconstructed video frame sequence of the second resolution according to a plurality of target reconstructed video frames corresponding to the plurality of to-be-processed video frames.

13. The computing device according to claim 12, wherein determining a contour region and a flat region in the initial reconstructed video frame according to a residual separation method comprises:

obtaining, for each to-be-processed video frame in the to-be-processed video frame sequence, a bicubic interpolation magnification result through bicubic interpolation;

performing residual separation according to the initial reconstructed video frame corresponding to the to-be-processed video frame and the bicubic interpolation magnification result to obtain a high-frequency mask and a low-frequency mask;

determining the contour region according to the initial reconstructed video frame, the bicubic interpolation magnification result, and the high-frequency mask; and determining the flat region according to the initial reconstructed video frame, the bicubic interpolation magnification result, and the low-frequency mask.

14. The computing device according to claim 12, wherein obtaining the to-be-processed video frame sequence of the first resolution comprises:

obtaining a video playback instruction;
playing a video file corresponding to the to-be-processed video frame sequence according to the video playback instruction; and in accordance with a detection of a resolution switching instruction of the video file, the switching instruction including specification of a second resolution:
for each to-be-processed video frame in the to-be-processed video frame sequence, performing resolution reconstruction on the to-be-processed video frame according to a resolution reconstruction model, to obtain an initial reconstructed video frame of a second resolution.

15. The computing device according to claim 12, the operations further comprising:

after generating the reconstructed video frame sequence of the second resolution:
determining a next video frame of a currently played video frame;
determining a target reconstructed video frame corresponding to the next video frame in the reconstructed video frame sequence;
switching to the target reconstructed video frame corresponding to the next video frame when the next video frame is played; and
playing the target reconstructed video frame in the reconstructed video frame sequence.

16. The computing device according to claim 12, wherein performing the resolution reconstruction comprises:
- performing residual extraction on the to-be-processed video frame at least twice by using the resolution reconstruction model to obtain residual extraction results; and
- performing resolution reconstruction on the to-be-processed video frame based on the residual extraction results, to obtain the initial reconstructed video frame of the second resolution.

17. A non-transitory computer-readable storage medium, storing a computer program, the computer program, when executed by one or more processors of a computing device, cause the one or more processors to perform operations comprising:
- obtaining a to-be-processed video frame sequence of a first resolution, the to-be-processed video frame sequence including a plurality of to-be-processed video frames;
- for each to-be-processed video frame in the to-be-processed video frame sequence:
  - performing resolution reconstruction according to a resolution reconstruction model so as to obtain an initial reconstructed video frame of a second resolution, wherein the second resolution is greater than the first resolution;
  - determining a contour region and a flat region in the initial reconstructed video frame according to a residual separation method; and
  - performing contour enhancement on the contour region and denoising on the flat region to obtain a target reconstructed video frame; and
- generating a reconstructed video frame sequence of the second resolution according to a plurality of target reconstructed video frames corresponding to the plurality of to-be-processed video frames.

18. The non-transitory computer-readable storage medium according to claim 17, wherein performing the resolution reconstruction comprises:
- performing residual extraction on the to-be-processed video frame at least twice by using the resolution reconstruction model to obtain residual extraction results; and
- performing resolution reconstruction on the to-be-processed video frame based on the residual extraction results, to obtain the initial reconstructed video frame of the second resolution.

19. The non-transitory computer-readable storage medium according to claim 18, wherein performing the residual extraction on the to-be-processed video frame comprises:
- performing convolution processing on the to-be-processed video frame by using a convolution layer in the resolution reconstruction model to obtain convolution processing results corresponding to the to-be-processed video frame; and
- sequentially performing residual extraction by using residual blocks in a backbone based on the convolution processing results to obtain the residual extraction results of the residual blocks, the residual blocks being cascaded.

20. The non-transitory computer-readable storage medium according to claim 17, wherein obtaining the to-be-processed video frame sequence of the first resolution comprises:
- obtaining a video playback instruction;
- playing a video file corresponding to the to-be-processed video frame sequence according to the video playback instruction; and
- in accordance with a detection of a resolution switching instruction of the video file, the switching instruction including specification of a second resolution:
  - for each to-be-processed video frame in the to-be-processed video frame sequence, performing resolution reconstruction on the to-be-processed video frame according to a resolution reconstruction model, to obtain an initial reconstructed video frame of a second resolution.

* * * * *